United States Patent [19]

Solomon et al.

[11] Patent Number: 5,467,344
[45] Date of Patent: Nov. 14, 1995

[54] PACKET DATA TRANSMISSION WITH ASYNCHRONOUS BANDWIDTH SWITCHING

[75] Inventors: David Solomon, River Vale; Zigmunds A. Putnins, Ridgewood; David W. Gish, Riverdale, all of N.J.; Jeffrey B. Mendelson, Shrewsbury, Mass.

[73] Assignee: Ascom Timeplex Trading AG, Bern, Switzerland

[21] Appl. No.: 232,952

[22] Filed: Apr. 25, 1994

[51] Int. Cl.⁶ .................................................. H04J 3/16
[52] U.S. Cl. .................... 370/58.3; 370/60.1; 370/84; 370/85.6; 370/85.7; 370/94.2; 370/95.1
[58] Field of Search .......................... 370/55, 58.1, 58.2, 370/58.3, 60, 60.1, 79, 84, 85.6, 85.7, 94.1, 94.2, 95.1

[56] References Cited

U.S. PATENT DOCUMENTS

| | | | |
|---|---|---|---|
| 4,763,319 | 8/1988 | Rozenblit | 370/85.7 X |
| 4,763,321 | 8/1988 | Calvignac et al. | 370/85.7 X |
| 4,819,226 | 4/1989 | Beckner et al. | 370/55 |
| 4,914,650 | 4/1990 | Sriram | 370/60 |
| 4,980,886 | 12/1990 | Bernstein | 370/85.7 X |
| 5,042,032 | 8/1991 | Digbe | 370/94.1 |
| 5,091,905 | 2/1992 | Amada | 370/60 |
| 5,132,964 | 7/1992 | Esaki | 370/60 |
| 5,136,584 | 8/1992 | Hedlund | 370/94.1 |
| 5,138,440 | 8/1992 | Radice | 358/13 |
| 5,278,827 | 1/1994 | Pound | 370/84 |

*Primary Examiner*—Douglas W. Olms
*Assistant Examiner*—Russell W. Blum
*Attorney, Agent, or Firm*—Irwin Ostroff; Robert B. Ardis

[57] ABSTRACT

The bandwidth of a packet data transmission node is switched asynchronously without interruption of data transmission and with a minimum of circuit complexity. In particular, a packet channel is permitted to "breathe", gaining bandwidth when additional bandwidth becomes available from other temporarily unused digital channels and losing such additional bandwidth when such unused digital channels revert to other use. To permit such uninterrupted asynchronous operation, a "pad" or "throw away" character is defined which is ignored or discarded when it is received by another packet network node. Such a "pad" or "throw-away" character is unique only in the sense that it is distinct from and may not be confused with characters or bytes which may occur in normal data transmission sequences.

30 Claims, 6 Drawing Sheets

| | TRANSMIT FRAME | | RECEIVE FRAME |
|---|---|---|---|
| 1 | TDM1, TOF | | TDM1, TOF |
| 2 | TDM2 | | TDM2 |
| 3 | PBND | | PBND |
| 4 | TDM1 | | TDM1 |
| 5 | TDM2 | | TDM2 |
| 6 | PBND | | PBND |
| 7 | TDM1 | | TDM1 |
| 8 | TDM2 | | TDM2 |
| 9 | PBND | | PBND |
| 10 | TDM1 | | TDM1 |
| 11 | TDM2 | | TDM2 |
| 12 | PBND | | PBND |
| 13 | TDM1 | | TDM1 |
| 14 | TDM2 | | TDM2 |
| 15 | PBND | | PBND |
| 16 | TDM1 | | TDM1 |
| 17 | TDM2 | | TDM2 |
| 18 | PBND | | PBND |
| 19 | TDM1 | | TDM1 |
| 20 | TDM2 | | TDM2 |
| 21 | PBND | | PBND |
| 22 | TDM1 | | TDM1 |
| 23 | TDM2 | | TDM2 |
| 24 | PBND | | PBND |

FIG. 6

| | TRANSMIT FRAME | | RECEIVE FRAME |
|---|---|---|---|
| 1 | TDM1, TOF | | TDM1, TOF |
| 2 | PAD | | TDM2 |
| 3 | PBND | | PBND |
| 4 | TDM1 | | TDM1 |
| 5 | PAD | | TDM2 |
| 6 | PBND | | PBND |
| 7 | TDM1 | | TDM1 |
| 8 | PAD | | TDM2 |
| 9 | PBND | | PBND |
| 10 | TDM1 | | TDM1 |
| 11 | PAD | | TDM2 |
| 12 | PBND | | PBND |
| 13 | TDM1 | | TDM1 |
| 14 | PAD | | TDM2 |
| 15 | PBND | | PBND |
| 16 | TDM1 | | TDM1 |
| 17 | PAD | | TDM2 |
| 18 | PBND | | PBND |
| 19 | TDM1 | | TDM1 |
| 20 | PAD | | TDM2 |
| 21 | PBND | | PBND |
| 22 | TDM1 | | TDM1 |
| 23 | PAD | | TDM2 |
| 24 | PBND | | PBND |

PACKET DATA TRANSMISSION WITH ASYNCHRONOUS BANDWIDTH SWITCHING

FIELD OF THE INVENTION

This invention relates generally to packet data transmission systems and, more particularly, to packet data transmission systems in which bandwidth is switched between packet transmission channels and other transmission channels which may themselves be voice transmission channels, transmission channels in the form of multiple voice transmission channels, or additional packet data transmission channels.

BACKGROUND OF THE INVENTION

In modern day digital telecommunications, the backbone for a packet data network is typically a T-1 Carrier digital transmission line or its equivalent. A T-1 Carrier digital transmission line operates at a bit rate of 1.544 megabits per second, providing a total bandwidth of 1,544 MHz, and normally supports 24 time division multiplexed digital DS0 channels. Each of these 24 digital DS0 channels has an effective bit rate of 64 kilobits per second, providing a bandwidth of 64 KHz each. A typical packet network includes a plurality of separate packet network nodes, coupled to one another by T-1 Carrier digital transmission lines or their equivalent.

A packet network node generally operates to assign a plurality of T-1 digital DS0 channels to form a broader band packet data transmission channel, leaving the remaining digital channels to be used either by additional packet data transmission channels or as such separate and distinct time division multiplex circuit switched channels as voice or channels in the form of multiple voice channels. Because such additional time division multiplex channels as separate voice channels or channels formed by multiple voice channels may sometimes be inactive, it can be useful to make their unused bandwidth available temporarily to increase the bandwidths available to active packet data transmission channels. In the past, such temporarily unused bandwidth has been reallocated either synchronously or asynchronously.

In synchronous reallocation, frame random access memories (often called, more simply, frame RAMs) containing digital channel allocation information in packet network nodes at both ends of a T-1 Carrier transmission line need to be reconfigured simultaneously in order to ensure continuous flow of data. In such arrangements, a second frame is typically developed with all changes incorporated within it at both source and destination nodes before a signal from the source node to the destination node specifies when to change the frame. Synchronous reconfiguration tends to be highly complex and demanding of memory, particularly when more than one packet channel is involved.

Past asynchronous reconfiguration techniques require that internodal packet data transmission be interrupted each time a frame RAM reconfiguration at opposite ends of the transmission system takes place. Typically, packet data buffering is required each time the frame is reconfigured. Such asynchronous bandwidth switching also becomes an increasingly complex process as additional digital channels are reallocated, particularly if more than one packet channel is involved.

SUMMARY OF THE INVENTION

The invention permits bandwidth in a packet data transmission system to be switched asynchronously without interruption of data transmission and with a minimum of circuit complexity. In particular, a packet channel is permitted to "breathe", gaining bandwidth when additional bandwidth becomes available from other temporarily unused digital channels and losing such additional bandwidth when such digital channels revert to other use. Frame RAMs in packet network nodes at both ends of a T-1 Carrier digital transmission line no longer need to be reconfigured simultaneously. To permit such uninterrupted asynchronous operation, a "pad" or "throw away" character is defined which is ignored or discarded whenever it is received by one packet network node from another. Such a "pad" or "throw-away" character is unique in the sense that it is distinct from and may not be confused with characters or bytes which may occur in normal data transmission sequences.

The invention overcomes problems encountered in the past by permitting packet traffic to continue flowing as bandwidth reconfiguration or switching takes place. Packet data continue to propagate at a rate consistent with the smaller of either the previous or the next packet band configuration while bandwidth switching occurs. The rate at which packet data flow during bandwidth switching is, in other words, either the rate immediately prior to or the rate immediately after bandwidth switching, depending upon which configuration allows for less packet bandwidth. Bandwidth switching may be completed in as little as a single frame and each reconfiguration is controlled by communication between packet nodes, thus eliminating any need for elaborate frame synchronization methods.

The invention, from one important aspect, takes the form of an asynchronously reconfigurable packet network node having a transmitting portion for transmitting digital message data to another remote packet network node over an outgoing digital transmission path and a receiving portion for receiving digital message data from the remote node over an incoming digital transmission path. Each of the digital transmission paths employed with such a reconfigurable packet node consists of a predetermined number of time division multiplexed digital channels. Each of the time division multiplexed digital channels has active and inactive states determined by respective digital channel connect and disconnect requests. In standard telecommunications terminology, a connect request causes a channel to shift from an inactive state to an active state, while a disconnect request causes a channel to shift from an active state to an inactive state.

From another important aspect, the invention takes the form of a method of operating one or more such asynchronously reconfigurable packet network nodes.

In an asynchronously reconfigurable packet network node constructed or operated in accordance with the invention, n of the digital channels in the outgoing transmission path are assigned to a packet data channel, where n is an integer equal to or greater than zero, and connect and disconnect requests are detected to signal shifts of any of the digital channels in the outgoing transmission path between respective active and inactive states. Predetermined pad characters ignored by a remote or destination node are transmitted in any of the digital channels in the outgoing transmission path in response to detection of respective connect or disconnect requests. A channel reassignment initiation signal is transmitted to the remote node over the outgoing transmission path and a channel reassignment acknowledgment signal is received from the remote node over the incoming transmission path. In response to receipt of the channel reassignment acknowledgment signal, the assignment with respect to the packet data channel of any of the digital channels in the outgoing transmission path containing the pad characters is changed. The available packet data channel bandwidth is thus increased or decreased by the number of digital channels added to or subtracted from the packet data channel without any need to interrupt data transmission or to reconfigure frame RAMs simultaneously in different nodes.

In accordance with one aspect of the invention, the integer n is at least unity if the resulting packet data channel is itself used to transmit channel reassignment initiation or acknowledgement signals. The integer n may be zero if channel reassignment initiation or acknowledgement signals are transmitted over any other DS0 channel or combination of DS0 channels.

For packet data channel bandwidth expansion, predetermined pad characters ignored by a remote or destination node are transmitted in any of the digital channels in the outgoing transmission path not assigned to the packet data channel in response to detection of respective channel disconnect requests. A channel reassignment initiation signal is transmitted to the remote node over the outgoing transmission path and a channel reassignment acknowledgment signal is received from the remote node over the incoming transmission path. In response to receipt of the channel reassignment acknowledgment signal, any of the digital channels in the outgoing transmission path containing the pad characters are assigned to the packet data channel. The bandwidth of the packet data channel is thus increased by the number of digital channels added to the packet data channel without any need to interrupt data transmission or to reconfigure frame RAMs simultaneously in different nodes. One or more digital channels may be added to an existing packet data channel or a new packet data channel may be created in this manner.

For packet data channel bandwidth compression, predetermined pad characters ignored by the remote node are transmitted in any of the digital channels in the outgoing transmission path assigned to the packet data channel in response to detection of respective channel connect requests. A channel reassignment initiation signal is transmitted to the remote node over the outgoing transmission path and a channel reassignment acknowledgment signal is received from the remote node over the incoming transmission path. In response to receipt of the channel reassignment acknowledgment signal, any of the digital channels in the outgoing transmission path containing the pad characters are reassigned to channels other than the packet data channel. The bandwidth of the packet data channel is thus decreased by the number of digital channels subtracted from the packet data channel without any need to interrupt data transmission or to reconfigure frame RAMs simultaneously in different nodes. One or more digital channels may be subtracted from the packet data channel in this manner.

The digital channels asynchronously added to or asynchronously subtracted from a packet data channel may be individually switched voice channels, may take the form of switched channels consisting of more than one digital channel each, may take the form of other packet data channels, or may take the form of any combination of the three. Respective channel reassignment initiation and channel reassignment acknowledgment signals are typically transmitted over packet data channels in the respective outgoing and incoming transmission paths.

The invention may be more fully understood from the following detailed description of a specific embodiment and its operation, taken in the light of the accompanying drawing and the appended claims. For convenience, an asynchronously reconfigurable packet network node embodying the invention is shown as having a transmitting portion and a receiving portion.

DETAILED DESCRIPTION

Figure 1:
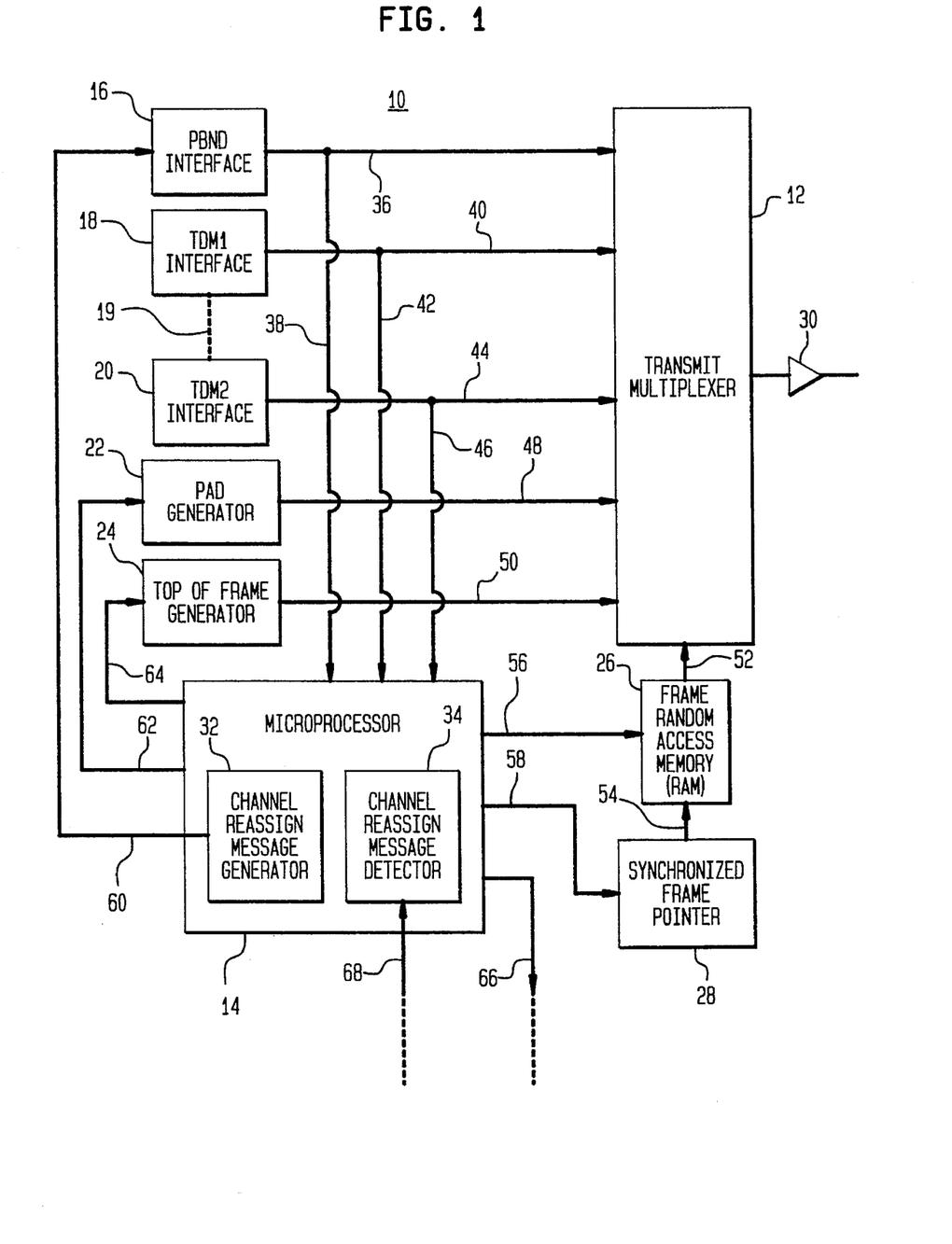
FIG. 1 is a block diagram of the transmitting portion of an asynchronously reconfigurable packet network node embodying the invention.

In FIG. 1, the transmitting portion 10 of an asynchronously reconfigurable packet network node embodying the invention includes a transmit multiplexer 12, a microprocessor 14, a packet band (PBND) interface 16, a time division multiplex (TDM1) interface 18, a time division multiplex (TDM2) interface 20, a pad character (PAD) generator 22, a top of frame generator 24, a frame random access memory (RAM) 26, a synchronized frame pointer 28, and a repeatered outgoing digital transmission line 30. Synchronized frame pointer 28, which points to the next location in a frame, advances during each time slot until the end of the frame is encountered and then resynchronizes to the top of the frame. Additional packet or time division multiplex interfaces to channelized service may be included, as indicated by a dashed line 19, between time division multiplex interfaces 18 and 20. Included as portions of microprocessor 14 are a channel reassignment message generator (Channel Reassign Message Generator) 32 and a channel reassignment message detector (Channel Reassign Message Detector) 34. Repeatered digital line 30 may, by way of example, take the form of a standard 24 channel T-1 Carrier digital transmission line or its equivalent, where each of the 24 digital channels is designated as a DS0 level channel.

Figure 2:
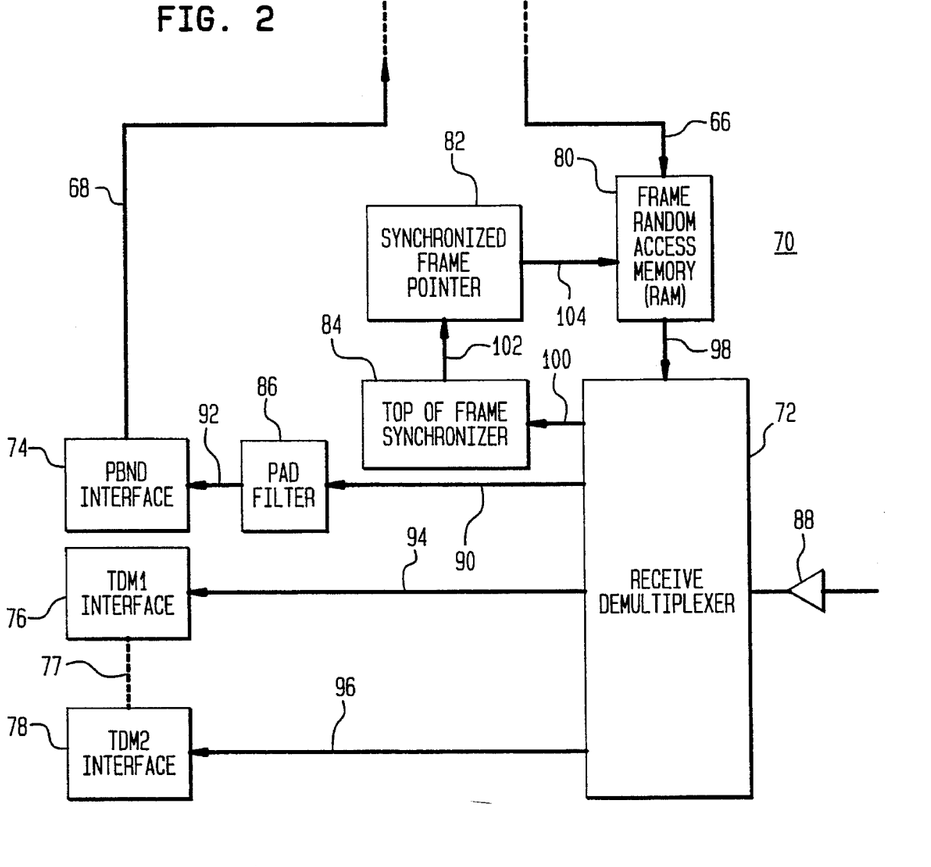
FIG. 2 is a block diagram of the receiving portion of an asynchronously reconfigurable packet network node embodying the invention.

The transmitting portion 10 in FIG. 1 of an asynchronously reconfigurable packet network node also includes a number of data paths 36, 38, 40, 42, 44, 46, 48, 50, 52, 54, 56, 58, 60, 62, 64, 66, and 68, the transmission directions of which are indicated by arrowheads. Data paths 36 and 38 couple packet network interface 16 to transmit multiplexer 12 and microprocessor 14, respectively. Data paths 40 and 42 couple time division multiplex interface 18 to transmit multiplexer 12 and microprocessor 14, respectively. Data paths 44 and 46 couple time division multiplex interface 20 to transmit multiplexer 12 and microprocessor 14, respectively. Data path 48 couples pad generator 22 to transmit multiplexer 12. Data path 50 couples top of frame generator 24 to transmit multiplexer 12.

Additionally in node transmitting portion 10, data path 52 couples frame RAM 26 to transmit multiplexer 12 and data path 54 couples synchronized frame pointer 28 to frame RAM 26. Data path 56 couples microprocessor 14 to frame RAM 26 and data path 58 couples microprocessor 58 to synchronized frame pointer 28. Data path 60 couples channel reassignment message generator 32 within microprocessor 14 to packet network interface 16, data path 62 couples microprocessor 14 to pad generator 22, and data path 64 couples microprocessor 14 to top of frame generator 24. Finally, data path 66 couples microprocessor 14 to the receiving portion (receiving portion 70 in FIG. 2) of the node and data path 68 couples the receiving portion of the node to channel reassignment message detector 34 within microprocessor 14.

In FIG. 2, the receiving portion 70 of an asynchronously reconfigurable packet network node embodying the invention provides functions complementary to those provided by transmitting portion 10 in FIG. 1 and includes a receive demultiplexer 72, a packet network (PBND) interface 74, a time division multiplex (TDM1) interface 76, a time division multiplex (TDM2) interface 78, a frame RAM 80, a synchronized frame pointer 82, a top of frame synchronizer 84, a pad filter 86, and a repeatered incoming digital transmission line 88. Additional packet or time division multiplex interfaces may be included, as indicated by a dashed line 77, between time division multiplex interfaces 76 and 78. Digital line 88 may, by way of example, take the form of a standard 24 channel T-1 Carrier digital transmission line, where each of the 24 digital channels is designated as a DS0 level channel.

Like its counterpart in transmitting portion 10 in FIG. 1, synchronized frame pointer 82 in receiving portion 70 points to the next location in a frame. Here, it first synchronizes itself with the top of frame indication received on the incoming data stream. Frame pointer 82 advances during each time slot until the end of the frame is encountered and then resynchronizes to the top of the frame. Frame RAM 80 is addressed by synchronized frame pointer 82 and its output controls receive demultiplexer 72. Receive demultiplexer 72 accepts control from frame RAM 80 and selects the appropriate destination for data. In the illustrated embodiment of the invention, the data destination may be any of PBND interface 74, TDM1 interface 76, TDM2 interface 78, and top of frame synchronizer 84.

Like their counterparts in transmitting portion 10, TDM interfaces 76 and 78 are interfaces to channelized service, while PBND interface 74 is an interface to packetized data service. These interfaces provide connections from receiving portion 10 to appropriate external environment. Top of frame synchronizer 84 controls synchronized frame pointer 82 and determines if the receive frame is synchronized with the incoming data stream. If it is not, top of frame synchronizer finds the top of frame and forces the frame pointer into synchronization. Pad filter 86 recovers pad or intra packet fill characters from the received data stream and removes them before PBND interface 74 can perform any operations on them. In this way, the DS0 channels associated with packet data traffic that also contain these pad characters effectively do not exist as far as PBND interface 74 is concerned. The effect is to allow uninterrupted packet data flow during the dynamic packet bandwidth modification process, otherwise known as "breathing".

Node receiving portion 70 in FIG. 2 also includes a number of data transmission paths 66, 68, 90, 92, 94, 96, 98, 100, 102, and 104, the transmission directions of which are indicated by arrowheads. Data path 90 couples receive demultiplexer 72 to pad filter 86, and data path 92 couples pad filter 86 to packet band interface 74. Data path 94 couples receive demultiplexer 72 to time division multiplex interface 76, and data path 96 couples receive demultiplexer 72 to time division multiplex interface 78.

Additionally in the receiving portion 70, data path 98 couples frame RAM 80 to receive demultiplexer 72, data path 100 couples receive demultiplexer 72 to top of frame synchronizer 84, data path 102 couples top of frame synchronizer 84 to synchronized frame pointer 82, and data path 104 couples synchronized frame pointer 82 to frame RAM 80. Finally, data path 66 (a continuation of data path 66 in transmitting portion 10 in FIG. 1) is coupled from microprocessor 14 (in FIG. 1) to frame RAM 80, and data path 68 (a continuation of data path 68 in transmitting portion 10 in FIG. 1) is coupled from packet band network interface 74 to channel reassignment message detector 34 in microprocessor 14 (in FIG. 1).

Figure 3:
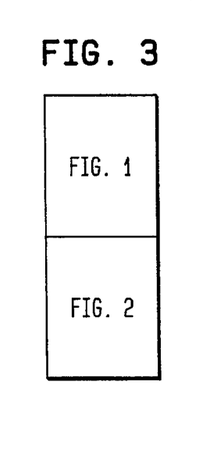
FIG. 3 illustrates how the diagrams of FIGS. 1 and 2 fit together to form a block diagram of a complete packet network node embodying the invention.

FIG. 3 illustrates the manner in which FIGS. 1 and 2 are combined to form a complete asynchronously reconfigurable network node embodying the invention. As shown, FIG. 1 is placed immediately above FIG. 2, with connections between the two figures consisting of data paths 66 and 68.

Figure 4:
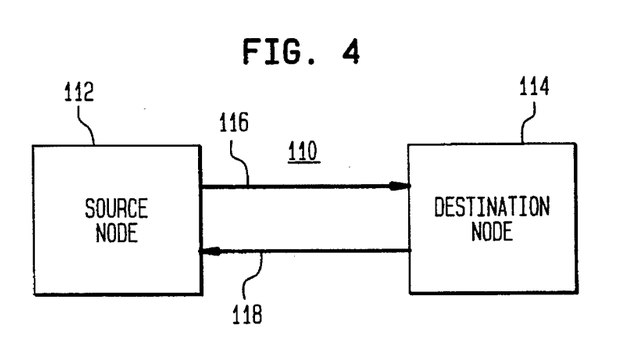
FIG. 4 is a block diagram illustrating how source and destination packet network nodes embodying the invention work together.

FIG. 4 shows a complete packet data system 110 which includes a source node 112, a destination node 114, a data path 116 from source node 112 to destination node 114, and a data path 118 from destination node 118 to source node 112. Source node 112 and destination node 114 are both asynchronously reconfigurable packet network nodes embodying the invention and each includes both a transmitting portion 10 (as shown in FIG. 1) and a receiving portion 70 (as shown in FIG. 2). Each of data paths 116 and 118 may, by way of example, take the form of a 1.544 megabit T-1 Carrier repeatered digital transmission line, supporting 24 time division multiplexed 64 kilobit DS0 channels.

Figure 5:
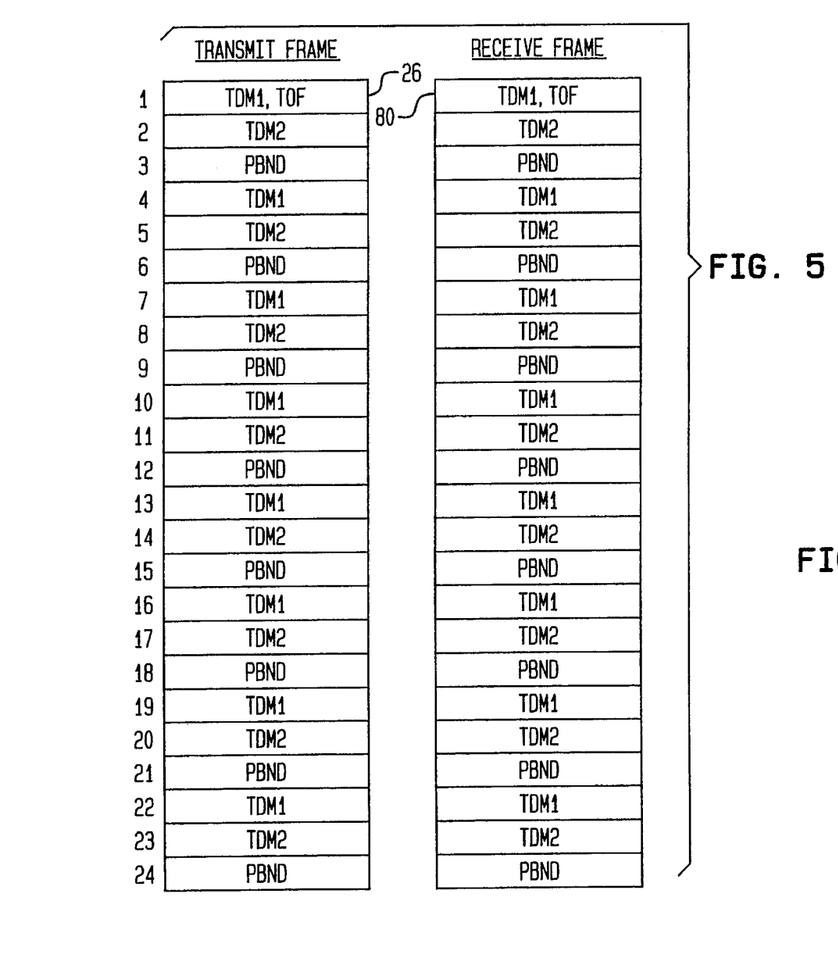
FIG. 5 illustrates transmit and receive frames stored in frame RAMs in source and destination packet network nodes embodying the invention prior to packet band expansion.

FIGS. 5 through 8 illustrate the contents of frame RAM 26 in source node 112 and frame RAM 80 in destination node 114, respectively, during successive stages of packet band expansion in accordance with the invention. In FIG. 5, frame RAM 26 and frame RAM 80 store, for each of the 24 digital carrier channels (DS0 level) supported by a T-1 Carrier digital transmission line, identification of the network interface, whether packet band or time division multiplex, accessed by that channel. The result, in each frame RAM, is a complete identification of the transmit frame in source node 112 and the receive frame in destination node 114. Prior to packet band expansion, the contents of both frame RAM 26 and frame RAM 80 are identical.

By way of illustration, system 110 in FIG. 4 begins with 8 DS0 channels assigned to a 512 kilobit per second packet band (PBND), 8 DS0 channels assigned to a first 512 kilobit per second time division multiplex band (TDM1), and 8 DS0 channels assigned to a second 512 kilobit per second time division multiplex band (TDM2). In practice, there may be more packet bands and more or fewer time division multiplex bands, and the packet bands and time division multiplex bands may contain more or fewer DS0 channels than shown in the example. As illustrated in FIG. 5, the initial channel lineups, prior to packet band expansion, include DS0 channels 1, 4, 7, 10, 13, 16, 19, and 22 assigned to TDM1, DS0 channels 2, 5, 8, 11, 14, 17, 20, and 23 assigned to TDM2, and DS0 channels 3, 6, 9, 12, 15, 18, 21, and 24 assigned to the packet band (PBND). For synchronization purposes, both frame RAM 26 and frame RAM 80 contain a top of frame (TOF) marker associated with DS0 channel 1. As illustrated, the channel lineups in both frame RAM 26 and frame RAM 80 are originally identical.

Figure 6:
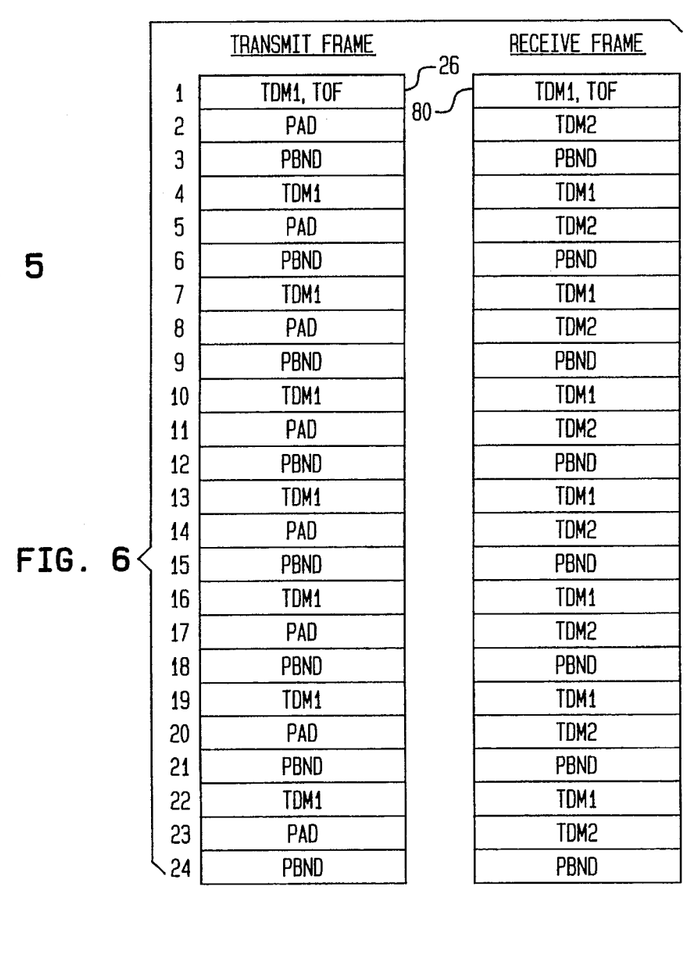
FIG. 6 illustrates transmit and receive frames stored in frame RAMs in source and destination packet network nodes embodying the invention during the first stage of packet band expansion.

FIG. 6 illustrates the channel lineups in frame RAMs 26 and 80 during the first stage of packet band expansion. A disconnect request has been received by time division multiplex interface 20 for each of DS0 channels 2, 5, 8, 11, 14, 17, 20, and 23 constituting TDM2. In frame RAM 26, a pad or throwaway character PAD has replaced the TDM2 designation for each of those newly available DS0 channels. All channel assignments in frame RAM 80 remain the same as in FIG. 5. Destination node 114 ignores all pad characters PAD and a channel reassignment initiation signal is sent, by way of example, from source node 112 to destination node 114 over packet band PBND. Alternatively, the channel reassignment initiation signal may be sent over any other DS0 channel or combination of DS0 channels.

Figure 7:
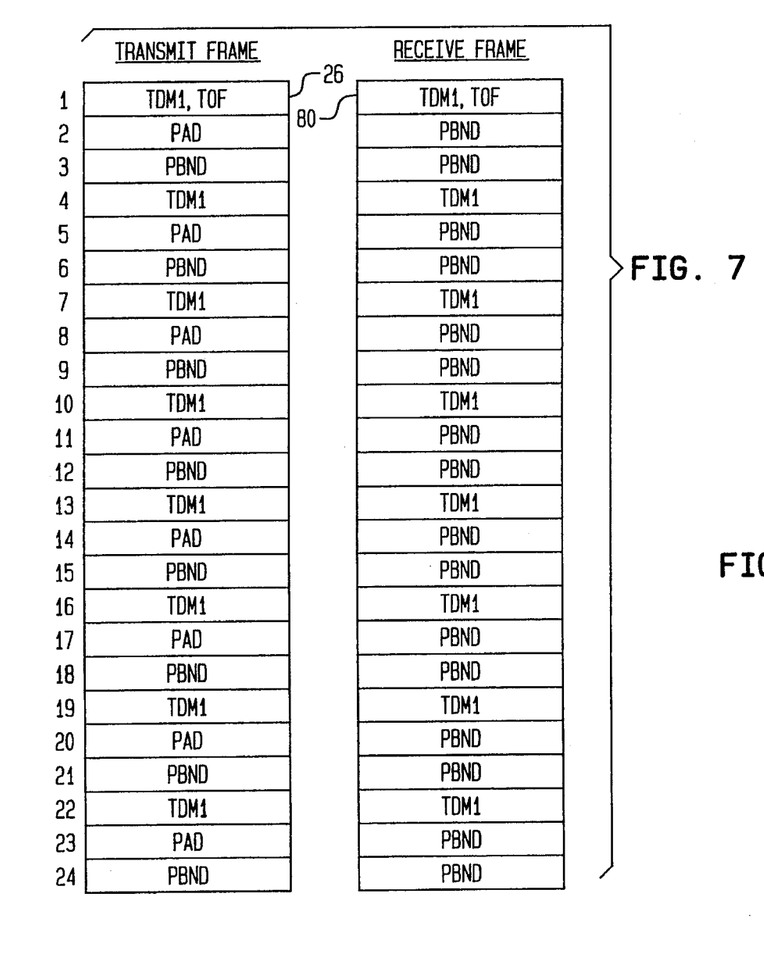
FIG. 7 illustrates transmit and receive frames stored in frame RAMs in source and destination packet network nodes embodying the invention during the second stage of packet band expansion.

FIG. 7 illustrates the channel lineups in frame RAMs 26 and 80 during the second stage of packet band expansion. The pad characters PAD and the channel reassignment initiation signal have been received in destination node 114 but pad filter 86 removes the pad characters PAD before they can be acted upon by PBND interface 74. The channel lineup in frame RAM 26 remains the same as in FIG. 6, but the channel lineup in frame RAM 80 has changed so that DS0 channels 2, 5, 8, 11, 14, 17, 20, and 23 have been disconnected from TDM2 and reassigned to packet band PBND. At the same time, a channel reassignment acknowledgement signal is sent, by way of example, in a packet band from destination node 114 to source node 112. Alternatively, the channel reassignment acknowledgement signal may be sent over any other DS0 channel or combination of DS0 channels. Sixteen DS0 channels (2, 3, 5, 6, 8, 9, 11, 12, 14, 15, 17, 18, 20, 21, 23, and 24) are now assigned to packet band PBND in frame RAM 80. In the meantime, packet band PBND has lost no bandwidth, there has been no interruption of packet traffic, and no synchronized frame switch has been needed.

Figure 8:
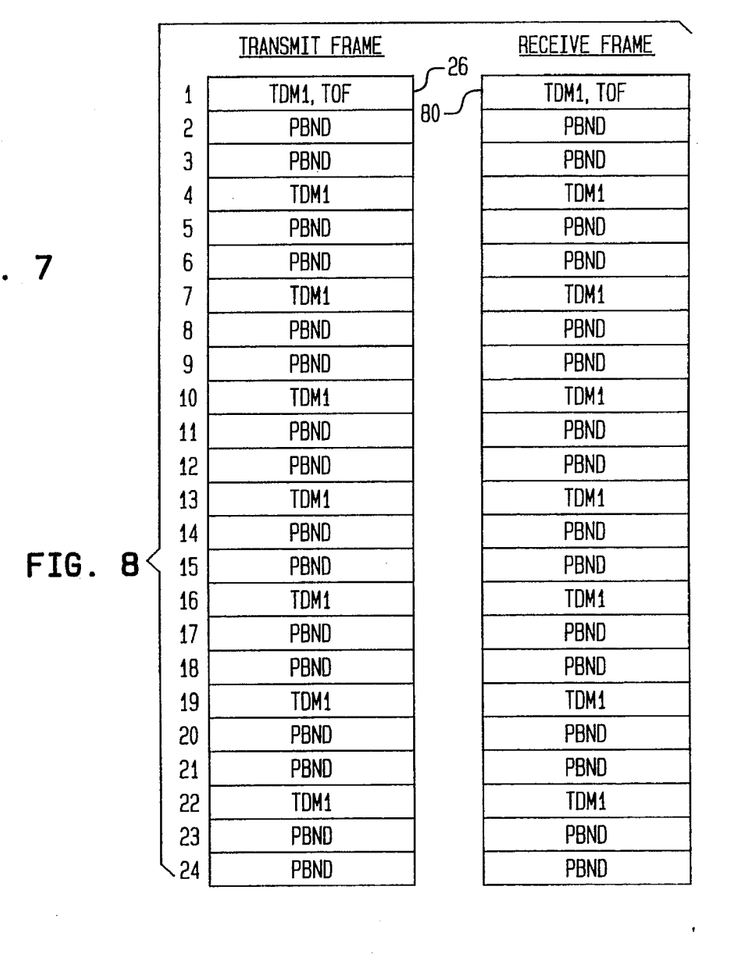
FIG. 8 illustrates transmit and receive frames stored in frame RAMs in source and destination packet network nodes embodying the invention after packet band expansion.

FIG. 8 illustrates the channel lineups in random access memories 26 and 80 after packet band expansion has been completed. The channel reassignment acknowledgement signal has now been received from destination node 114 by source node 112. As illustrated, the channel lineup in frame RAM 80 remains the same as in FIG. 7 and the channel lineup in frame RAM 26 is the same as that in frame RAM 80. The pad or throwaway characters PAD have been removed from DS0 channels, 2, 5, 8, 11, 14, 17, 20, and 23 and those channels have been reassigned to packet band PBND. In both source node 112 and destination node 114, packet band PBND now occupies both the original packet band DS0 channels 3, 6, 9, 12, 15, 18, 21, and 25 and the disconnected TDM2 channels 2, 5, 8, 11, 14, 17, 20, and 23. At this point, packet band PBND is using the full bandwidth of both the DS0 channels of the original packet band and the original TDM2 DS0 channels.

Figures 9, 10:
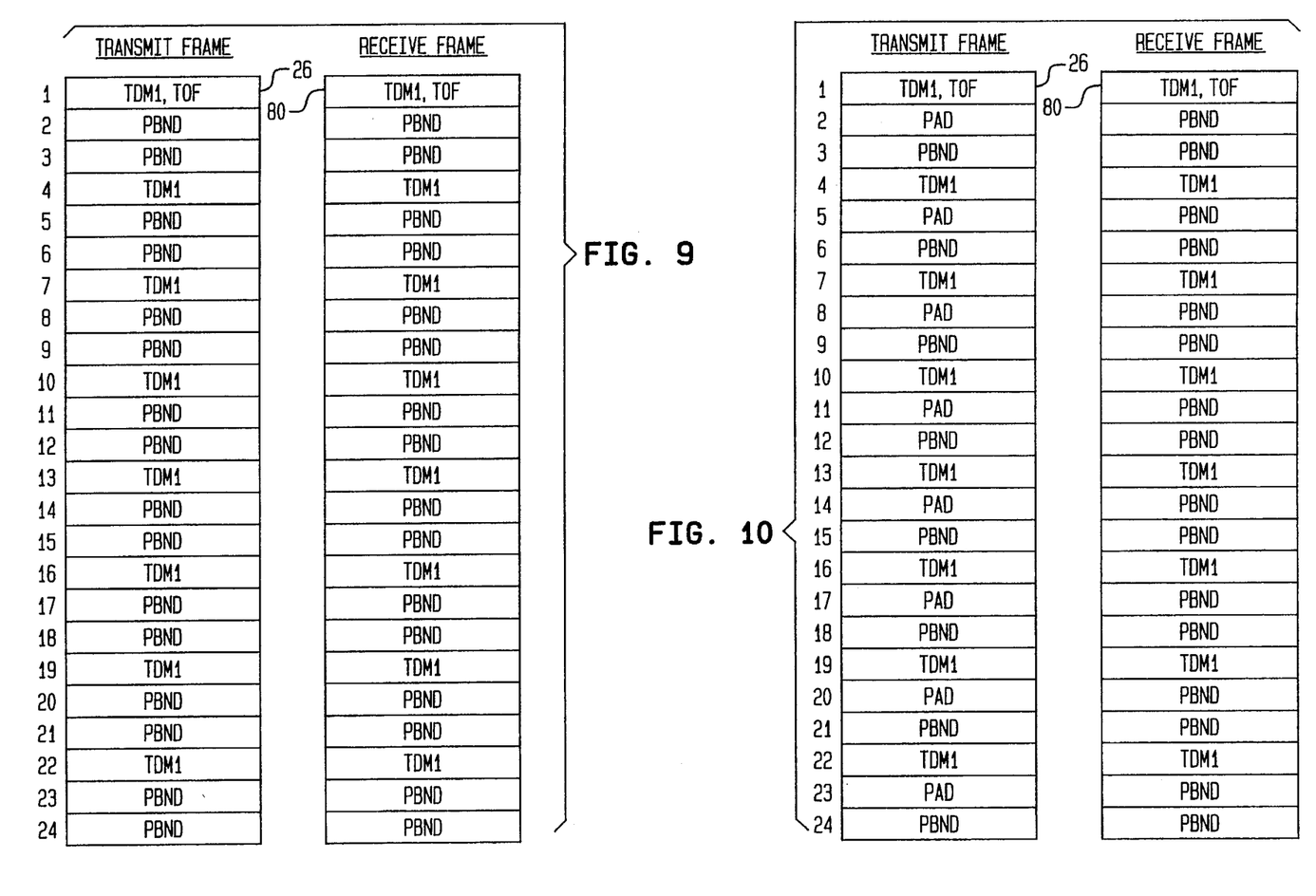
FIG. 9 illustrates transmit and receive frames stored in frame RAMs in source and destination packet network nodes embodying the invention before packet band compression.
FIG. 10 illustrates transmit and receive frames stored in frame RAMs in source and destination packet network nodes embodying the invention during the first stage of packet band compression.

FIGS. 9 through 12 illustrate the contents of frame RAM 26 in source node 112 and frame RAM 80 in destination node 114, respectively, during successive stages of packet band compression in accordance with the invention. In FIG. 9, frame RAM 26 and frame RAM 80 store, for each of the 24 digital carrier channels (DS0 level) supported by a T-1 Carrier digital transmission line, identification of the network interface, whether packet band or time division multiplex, accessed by that channel. The result, in each frame RAM, is once again a complete identification of the transmit frame in source node 112 and the receive frame in destination node 114. Prior to packet band compression, the contents of both frame RAM 26 and frame RAM 80 are originally identical.

By way of further illustration, system 110 in FIG. 4 begins with 16 DS0 channels assigned to a 1024 kilobit per second packet band (PBND) and 8 DS0 channels assigned to a first 512 kilobit per second time division multiplex band (TDM1). In practice, there may be more packet bands and more or fewer time division multiplex bands, and the packet bands and time division multiplex bands may contain more or fewer channels than shown in the example. As illustrated in FIG. 9, the initial channel lineups, prior to packet band compression, include DS0 channels 1, 4, 7, 10, 13, 16, 19, and 22 assigned to TDM1 and DS0 channels 2, 3, 6, 8, 9, 11, 12, 14, 15, 17, 18, 20, 21, 23, and 24 assigned to the packet band (PBND). For synchronization purposes, both frame RAM 26 and frame RAM 80 contain a top of frame (TOF) marker associated with DS0 channel 1. As illustrated, the channel lineups in both frame RAM 26 and frame RAM 80 are identical.

FIG. 10 illustrates the channel lineups in frame RAMs 26 and 80 during the first stage of packet band compression. A connect request has been received by time division multiplex interface 20 for each of DS0 channels 2, 5, 8, 11, 14, 17, 20, and 23 constituting TDM2. In frame RAM 26, a pad or throw away character PAD has replaced the PBND designation for each of those no longer available DS0 channels. All channel assignments in frame RAM 80 remain the same as in FIG. 9. Destination node 114 ignores all pad characters PAD and a channel reassignment initiation signal is sent, by way of example, from source node 112 to destination node 114 over packet band PBND. Alternatively, the channel reassignment initiation signal may be sent over any other DS0 channel or combination of DS0 channels.

Figures 11, 12:
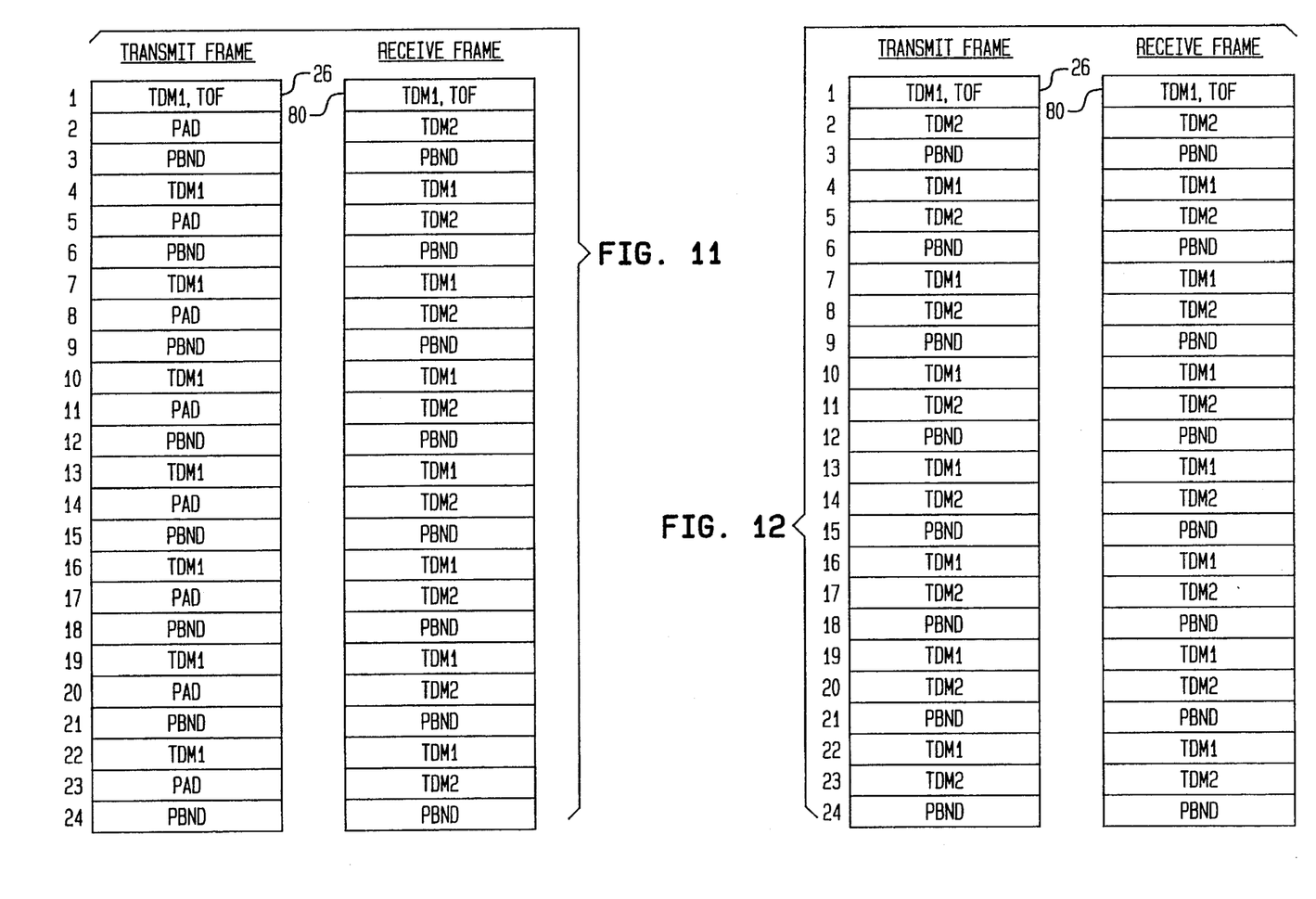
FIG. 11 illustrates transmit and receive frames stored in frame RAMs in source and destination packet network nodes embodying the invention during the second stage of packet band compression.
FIG. 12 illustrates transmit and receive frames stored in frame RAMs in source and destination packet network nodes embodying the invention after packet band compression.

FIG. 11 illustrates the channel lineups in frame RAMs 26 and 80 during the second stage of packet band compression. The pad characters PAD and the channel reassignment signal have been received in destination node 114 but pad filter 86 removes the pad characters PAD before they can be acted upon by PBND interface 74. The channel lineup in frame RAM 26 remains the same as in FIG. 6, but the channel lineup in frame RAM 80 has changed so that DS0 channels 2, 5, 8, 11, 14, 17, 20, and 23 have been disconnected from packet band PBND and reassigned to TDM2. At the same time, a channel reassignment acknowledgement signal is sent, by way of example, in a packet band from destination node 114 to source node 112. Alternatively, the channel reassignment acknowledgement signal may be sent over any other DS0 channel or combination of DS0 channels. In frame RAM 80, DS0 channels 1, 4, 7, 10, 13, 16, 19, and 22 are assigned to TDM1, DS0 channels 2, 5, 8, 11, 14, 17, 20, and 23 are assigned to TDM2, and DS0 channels 3, 6, 9, 12, 15, 18, 21, and 24 are assigned to packet band PBND in frame RAM 80. In the meantime, packet band PBND has continued to operate at a 512 kilobit per second bit rate (its bit rate after compression), there has been no interruption of packet traffic, and no synchronized frame switch has been needed.

FIG. 12 illustrates the channel lineups in frame RAMs 26 and 80 after pack band compression has been completed. The channel reassignment acknowledgement signal has been received from destination node 114 by source node 112. As illustrated, the channel lineup in frame RAM 80 remains the same as in FIG. 11 and the channel lineup in frame RAM 26 is the same as that in frame RAM 80. The pad or throw away characters PAD have been removed from DS0 channels 2, 5, 8, 11, 14, 17, 20, and 23 and those channels have been reassigned to TDM2. In both source node 112 and destination node 114, packet band PBND now occupies only DS0 channels 3, 6, 9, 12, 15, 18, 21, and 24 and TDM2 now occupies DS0 channels 2, 5, 8, 11, 14, 17, 20, and 23. Packet band PBND, TDM1, and TDM2 are now all operating at 512 kilobit per second bit rates.

Two examples of actual data streams transmitted in a packet band from source node 112 to destination node 114 during successive packet band expansion and packet band compression are illustrated in TABLES 1 and 2 below.

TABLE 1

EXAMPLE OF SINGLE CHANNEL
PACKET BAND EXPANSION AND
COMPRESSION
DATA: 24,12,15,62,5A,75,10,27,40 . . .
DATA OUT

| DS0 | BEFORE | 8 INACT | 8 ADDED | 9 ACTIVE | 9 DROPPED |
|---|---|---|---|---|---|
| 1 | 5A | 5A | 5A | 5A | 5A |
| 2 | 64 | 64 | 64 | 64 | 64 |
| 5 | 12 | 12 | 12 | 12 | 12 |
| 7 | 15 | 15 | 15 | 15 | 15 |
| 8 |  | 24 | 62 | 62 | 62 |
| 9 | 62 | $\overline{62}$ | 5A | 24 |  |
| 15 | 5A | 5A | 7A | $\overline{5A}$ | 5A |
| 16 | 7A | 7A | 75 | 7A | 7A |
| 17 | 75 | 75 | 10 | 75 | 75 |

ESC=5A
PAD=24
REPLACE 5A WITH 5A,7A
(SEND PLAIN TEXT 5A AS 5A,7A)
REPLACE 24 WITH 5A,64
(SEND PLAIN TEXT 24 AS 5A,64)

TABLE 1 illustrates the manner in which the invention permits asynchronous packet band expansion and compression from the standpoint of characters actually transmitted from source node 112 to destination node 114. In this example expansion and compression both involve only single DS0 channels. As shown, it is assumed, by way of example, that the data actually being transmitted over the packet band channel consist of a sequential character stream 24, 12, 15, 62, 5A, 75, 10, 27, 40 . . . An actual data stream will contain many additional characters, but these will suffice for illustration purposes. It is assumed that the packet band, before expansion, consists of DS0 channels 1, 2, 5, 7, 9, 15, 16, and 17 and that DS0 channel 8 is assigned to a time division multiplex channel. It is further assumed, by way of example, that 5A is designated as an escape character and that 24 is designated as the pad character. To send a plain text 5A, by way of example, the characters actually sent are 5A, 7A and to send a plain text 24, by way of example, the characters actually sent are 5A, 64. For ease of illustration, each column begins with the same sequence of data characters. In practice, each column would begin with whatever data character was being transmitted when the transition to the status represented by the column began.

The first column (DS0) in TABLE 1 identifies the DS0 channels with which the example is concerned. Before packet band expansion, the characters shown in the second column (BEFORE) are transmitted in the indicated packet band DS0 channels. DS0 channel 8 is shown blank in the second column because at this stage it is not carrying packet band information. Note that, because 24 has been reserved to represent the pad character, it has been replaced in the second column by the sequence 5A, 64 and that, because 5A has been reserved to represent an escape character, it has been replaced in the second column by the sequence 5A, 7A.

The third column (8 INACT) in TABLE 1 shows what happens when DS0 channel 8 goes inactive in response to a disconnect request. The pad character 24, which destination node 114 has been programmed to ignore or discard, is transmitted in DS0 channel 8. Pad character 24 has been italicized in TABLE 1 for emphasis.

The fourth column (8 ADDED) in TABLE 1 shows what happens after DS0 channel 8 has been added to the packet band. Packet band data characters are now transmitted in sequence in the respective packet band DS0 channels.

The fifth column (9 ACTIVE) in TABLE 1 shows what happens after DS0 channel 9 is about to be preempted by a time division multiplex channel in response to a connect request. Pad character 24 is transmitted in DS0 channel 9 and the packet band data stream is confined to DS0 channels 1, 2, 5, 7, 8, 15, 16, and 17.

The sixth column (9 DROPPED) in TABLE 1 shows what happens after DS0 channel has been dropped from the packet band channel. The packet band data stream is confined to DS0 channels 1, 2, 5, 7, 8, 15, 16, and 17.

TABLE 2

EXAMPLE OF PACKET BAND COMPRESSION
DATA: 24,12,15,62,5A,75,10,27,40 . . .
DATA OUT

| DS0 | BEFORE | 8,10,11 INACT | 8,10,11 ADDED | 15,16 ACTIVE | 15,16 DROPPED |
|---|---|---|---|---|---|
| 1 | 5A | 5A | 5A | 5A | 5A |
| 2 | 64 | 64 | 64 | 64 | 64 |
| 5 | 12 | 12 | 12 | 12 | 12 |
| 7 | 15 | 15 | 15 | 15 | 15 |
| 8 |  | 24 | 62 | 62 | 62 |
| 9 | 62 | $\overline{62}$ | 5A | 5A | 5A |
| 10 |  | 24 | 7A | 7A | 7A |
| 11 |  | $\overline{24}$ | 75 | 75 | 75 |
| 15 | 5A | $\overline{5A}$ | 10 | 24 |  |
| 16 | 7A | 7A | 27 | $\overline{24}$ |  |
| 17 | 75 | 75 | 40 | $\overline{10}$ | 10 |

ESC=5A
PAD=24
REPLACE 5A WITH 5A,7A
(SEND PLAIN TEXT 5A AS 5A,7A)

TABLE 2-continued

EXAMPLE OF PACKET BAND COMPRESSION
DATA: 24,12,15,62,5A,75,10,27,40 . . .
DATA OUT

| DS0 | BEFORE | 8,10,11 INACT | 8,10,11 ADDED | 15,16 ACTIVE | 15,16 DROPPED |
|---|---|---|---|---|---|
| | | REPLACE 24 WITH 5A,64 (SEND PLAIN TEXT 24 AS 5A,64) | | | |

TABLE 2 further illustrates the manner in which the invention permits asynchronous packet band expansion and compression from the standpoint of characters actually transmitted from source node 112 to destination node 114. In this example expansion and compression both involve multiple DS0 channels. As shown, it is again assumed, by way of example, that the data actually being transmitted over the packet band channel consist of the sequential character stream 24, 12, 15, 62, 5A, 75, 10, 27, 40 . . . An actual data stream will contain many additional characters, but these will suffice for illustration purposes. It is again assumed that the packet band, before expansion, consists of DS0 channels 1, 2, 5, 7, 9, 15, 16, and 17. This time, it is assumed that DS0 channels 8, 10, and 11 are assigned to one or more time division multiplex channels. It is again further assumed, by way of example, that 5A is designated as an escape character and that 24 is designated as the pad character. To send a plain text 5A, by way of example, the characters actually sent are 5A, 7A and to send a plain text 24, by way of example, the characters actually sent are 5A, 64. For ease of illustration once more, each column begins with the same sequence of data characters. In practice, each column would begin with whatever data character was being transmitted when the transition to the status represented by the column began.

The first column (DS0) in TABLE 2 identifies the DS0 channels with which the example is concerned. Before packet band expansion, the characters shown in the second column (BEFORE) are transmitted in the indicated packet band DS0 channels. DS0 channels 8, 10, and 11 are shown blank in the second column because at this stage they are not carrying packet band information. Note that, because 24 has been reserved to represent the pad character, it has been replaced in the second column by the sequence 5A, 64 and that, because 5A has been reserved to represent an escape character, it has been replaced in the second column by the sequence 5A, 7A.

The third column (8, 10, 11 INACT) in TABLE 2 shows what happens when DS0 channels 8, 10, and 11 go inactive in response to disconnect requests. The pad character 24, which destination node 114 has been programmed to ignore or discard, is transmitted in DS0 channels 8, 10, and 11. Pad character 24 has been italicized in TABLE 2 for emphasis.

The fourth column (8, 10, 11 ADDED) in TABLE 2 shows what happens after DS0 channels 8, 10, and 11 have been added to the packet band. Packet band data characters are now transmitted in sequence in the respective packet band DS0 channels.

The fifth column (15, 16 ACTIVE) in TABLE 2 shows what happens after DS0 channels 15 and 16 are about to be preempted by a time division multiplex channel in response to connect requests. Pad character 24 is transmitted in DS0 channels 15 and 16 and the packet band data stream is confined to DS0 channels 1, 2, 5, 7, 8, 9, 10, 11, and 17.

The sixth column (15, 16 DROPPED) in TABLE 1 shows what happens after DS0 channels 15 and 16 have been dropped from the packet band channel. The packet band data stream is confined to DS0 channels 1, 2, 5, 7, 8, 9, 10, 11, and 17.

Pseudo code illustrating the manner in which relevant portions of microprocessor 14 in FIG. 1 may be programmed to achieve the results which have been described in connection with the examples of FIGS. 5 through 12 and of TABLES 1 and 2 is given in Appendix A.

It is to be understood that the embodiment of the invention which has been described is illustrative. Numerous other arrangements and modifications may be readily devised by those skilled in the art without departing from the spirit and scope of the invention.

---

APPENDIX A comment: Definitions used in pseudo code

---

```
define
    tdm_channel_x.len:
            the number of DS0 channels that make up this tdm channel
    tdm_channel_x.dso_channels[i] :
            an array that contains the T1's channel numbers in
            which the tdm channel is carried. It has a length of
            24 entries, of which only tdm_channel_x.len are
            significant
    tdm_channel_x.frame_index[i] :
            an array that contains the indices in the node's frame
            ram which direct data transfers between the
            tdm_channel_x and the T1. It has a length of
            tdm_channel_x.len
    packet_band.len:
            the number of DS0 channels that make up this packet
            band
    packet_band.dso_channels[i] :
            an array that contains the T1's channel numbers in
            which the packet band is carried. It has a length of
            24, of which only packet_band.len are significant.
    packet_band.frame_index[i] :
            an array that contains the indices in the node's frame
            ram which direct data transfers between the packet band
            and the T1. It has a length of packet_band.len
    node.frame_ram[i] :
```

APPENDIX A comment: Definitions used in pseudo code

```
            the node's frame ram, this directs all data transfers
            in the node
end define
comment:    Pseudo-code for disconnecting a TDM channel and
            asynchronously adding its DS0 channels to the packet
            band
begin source node:
    i = 0;
    while i < tdm_channel_x.len
            m=tdm_channel_x.frame_index[i];
            node.frame_ram[m] = PAD;
            i++;
    end while;
    send to destination node message="disconnect tdm_channel_x";
    wait for destination node message="disconnect acknowledge";
    i=0;
    j=packet_band.len;
    while i < tdm_channel_x.len
            k=tdm_channel_x.frame_index[i];
            packet_band.frame_index[j] = k
            node_frame_ram[k] = PACKET_BAND;
            m=tdm_channel_x.dso_channels[i];
            packet_band.dso_channels[j] = m;
            i++;
            j++;
    end while;
    packet_band.len = packet_band_len + tdm_channel_x.len
    tdm_channel_x.len = 0;
end source node;
begin destination node:
    wait for source node message="disconnect tdm_channel_x";
    i=0;
    j=packet_band.len;
    while i < tdm_channel_x.len
            k=tdm_channel_x.frame_index[i];
            packet_band.frame_index[j] = k
            node_frame_ram[k] = PACKET_BAND;
            m=tdm_channel_x.dso_channels[i];
            packet_band.dso_channels[j] = m;
            i++;
            j++;
    end while;
    packet_band.len = packet_band_len + tdm_channel_x.len
    tdm_channel_x.len = 0;
    send to source node message="disconnect acknowledge";
end destination node;
comment:    Pseudo-code for connecting a TDM channel of "Y" DS0
            channels and asynchronously dropping its DS0 channels from
            the packet band
begin source node:
    tdm_channel_x.len = Y;
    i=0;
    j = packet_band.len;
    while i < tdm_channel_x.len
            j--;
            k = packet_band.frame_index[j] ;
            node.frame_ram[k] = PAD;
            tdm_channel_x.frame_index[i] = k;
            m = packet_band.dso_channel[j];
            tdm_channel_x.dso_channel[i] = m;
            i++;
    end while;
    packet_band.len = packet_band.len - tdm_channel_x.len;
    send to destination node message="connect tdm channel_x, size Y";
    wait for destination node message="connect acknowledge";
    i=0;
    while i < tdm_channel_x.len
            k=tdm_channel_x.frame_index[i];
            node.frame_ram[k] = CHANNEL_X;
            i++;
    end while;
end source node;
begin destination node:
    wait for source node message="connect tdm channel_x, size Y";
    tdm_channel_x.len = Y;
```

-continued

APPENDIX A comment: Definitions used in pseudo code

```
i=0;
j = packet_band.len;
while i < tdm_channel_x.len
    j--;
    k = packet_band.frame_index[j];
    node.frame_ram[k] = CHANNEL_X;
    tdm_channel_x.frame_index[i] = k;
    m = packet_band.dso_channel[j] ;
    tdm_channel_x.dso_channel[i] = m;
    i++;
end while;
packet_band.len = packet_band.len - tdm_channel_x.len;
send to source node message="connect acknowledge";
end destination node;
```

What is claimed is:

1. An asynchronously reconfigurable packet network node for transmitting digital message data to a remote packet network node over an outgoing digital transmission path and receiving digital message data from said remote node over an incoming digital transmission path, each of said digital transmission paths comprising a plurality of time division multiplexed digital channels and each of said digital channels having active and inactive states in response to respective channel connect and disconnect requests, said reconfigurable node comprising:

means for assigning to a packet data channel n of said digital channels in said outgoing transmission path, where n is an integer equal to or greater than zero;

means for detecting appearance of connect/disconnect requests for any of said digital channels in said outgoing transmission path;

means for transmitting predetermined unique pad characters in any of said digital channels in said outgoing transmission path in response to detection of the appearance of respective connect/disconnect requests for such channels, where said pad characters are ignored by said remote node whenever received and the flow of data in said packet data channel continues without interruption;

means for transmitting a channel reassignment initiation signal to said remote node over said outgoing transmission path;

means for receiving a channel reassignment acknowledgment signal from said remote node over said incoming transmission path, said acknowledgment signal signaling completion at said remote node of the channel reassignment requested by said initiation signal; and means responsive to receipt of said channel reassignment acknowledgment signal for changing the bandwidth of said packet data channel by changing the assignment with respect to said packet data channel of any of said digital channels in said outgoing transmission path containing said pad characters, where the flow of data in said packet data channel continues without interruption through said bandwidth change even though said acknowledgment signal is received subsequent in time to channel reassignment at said remote node.

2. The asynchronously reconfigurable packet network node of claim 1 in which n is a positive integer and said channel reassignment initiation signal is transmitted over said packet data channel.

3. The asynchronously reconfigurable packet network node of claim 1 in which at least some digital channels in said outgoing transmission path for which connect/disconnect requests are detected are voice channels.

4. The asynchronously reconfigurable packet network node of claim 1 in which at least some digital channels in said outgoing transmission path for which connect/disconnect requests are detected comprise a single broad band time division multiplexed channel.

5. The asynchronously reconfigurable packet network node of claim 1 in which at least some digital channels in said outgoing transmission path for which connect/disconnect requests are detected comprise another packet data channel.

6. An asynchronously reconfigurable packet network node for transmitting digital message data to a remote packet network node over an outgoing digital transmission path and receiving digital message data from said remote node over an incoming digital transmission path, each of said digital transmission paths comprising a plurality of time division multiplexed digital channels and each of said digital channels having respective active and inactive states in response to respective channel connect and disconnect requests, said reconfigurable node comprising:

means assigning to a packet data channel n of said digital channels in said outgoing transmission path, where n is an integer equal to or greater than zero;

means for detecting disconnect requests for any of said digital channels in said outgoing transmission path;

means for transmitting predetermined unique pad characters in any of said digital channels in said outgoing transmission path not assigned to said packet data channel in response to detection of respective channel disconnect requests, where said pad characters are ignored by said remote node whenever received and the flow of data in said packet data channel continues without interruption;

means for transmitting a channel reassignment initiation signal to said remote node over said outgoing transmission path;

means for receiving a channel reassignment acknowledgment signal from said remote node over said incoming transmission path, said acknowledgment signal signaling completion at said remote node of the channel reassignment requested by said initiation signal; and means responsive to receipt of said channel reassignment acknowledgment signal for expanding the bandwidth of said packet data channel by adding any of said digital channels in said outgoing transmission path containing said pad characters to the digital channels assigned to said packet data channel, where the flow of data in said packet data channel continues without interruption through said bandwidth expansion even though said acknowledgment signal is received subsequent in time to channel reassignment at said remote node.

7. The asynchronously reconfigurable packet network node of claim 6 in which n is a positive integer and said channel reassignment initiation signal is transmitted over said packet data channel.

8. The asynchronously reconfigurable packet network node of claim 6 in which at least some digital channels in said outgoing transmission path for which disconnect requests are detected are voice channels.

9. The asynchronously reconfigurable packet network node of claim 6 in which at least some digital channels in said outgoing transmission path for which disconnect requests are detected comprise a single broad band time division multiplexed channel.

10. The asynchronously reconfigurable packet network node of claim 6 in which at least some digital channels in said outgoing transmission path for which disconnect requests are detected comprise another packet data channel.

11. An asynchronously reconfigurable packet network node for transmitting digital message data to a remote packet network node over an outgoing digital transmission path and receiving digital message data from said remote node over an incoming digital transmission path, each of said digital transmission paths comprising a plurality of time division multiplexed digital channels and each of said digital channels having active and inactive states in response to respective channel connect and disconnect requests, said reconfigurable node comprising:

means assigning to a packet data channel n of said digital channels in said outgoing transmission path, where n is a positive integer;

means for detecting connect requests for any of said digital channels in said outgoing transmission path;

means for transmitting predetermined unique pad characters in at least one of said digital channels in said outgoing transmission path assigned to said packet data channel in response to detection of respective channel connect requests, where said pad characters are ignored by said remote node whenever received and the flow of data in said packet data channel continues without interruption;

means for transmitting a channel reassignment initiation signal to said remote node over said outgoing transmission path;

means for receiving a channel reassignment acknowledgment signal from said remote node over said incoming transmission path, said acknowledgment signal signaling completion at said remote node of the channel reassignment requested by said initiation signal; and means responsive to receipt of said channel reassignment acknowledgment signal for contracting the bandwidth of said packet data channel by subtracting from said packet data channel any of said digital channels in said outgoing transmission path containing said pad characters, where the flow of data in said packet data channel continues without interruption through said bandwidth contraction even though said acknowledgment signal is received subsequent in time to channel reassignment at said remote node.

12. The asynchronously reconfigurable packet network node of claim 11 in which said channel reassignment initiation signal is transmitted over said packet data channel.

13. The asynchronously reconfigurable packet network node of claim 11 in which at least some digital channels in said outgoing transmission path for which connect requests are detected are voice channels.

14. The asynchronously reconfigurable packet network node of claim 11 in which at least some digital channels in said outgoing transmission path for which connect requests are detected comprise a single broad band time division multiplexed channel.

15. The asynchronously reconfigurable packet network node of claim 11 in which at least some digital channels in said outgoing transmission path for which connect requests are detected comprise another packet data channel.

16. A method of operating an asynchronously reconfigurable packet network node for transmitting digital message data to a remote packet network node over an outgoing digital transmission path and receiving digital message data from said remote node over an incoming digital transmission path, each of said digital transmission paths comprising a plurality of time division multiplexed digital channels and each of said digital channels having active and inactive states in response to respective channel connect and disconnect requests, said method comprising the steps of:

assigning to a packet data channel n of said digital channels in said outgoing transmission path, where n is an integer equal to or greater than zero;

detecting appearance of connect/disconnect requests for any of said digital channels in said outgoing transmission path;

transmitting predetermined unique pad characters in any of said digital channels in said outgoing transmission path in response to detection of the appearance of respective connect/disconnect requests for such channels, where said pad characters are ignored by said remote node whenever received and the flow of data in said packet data channel continues without interruption;

transmitting a channel reassignment initiation signal to said remote node over said outgoing transmission path;

receiving a channel reassignment acknowledgment signal from said remote node over said incoming transmission path, said acknowledgment signal signaling completion at said remote node of the channel reassignment requested by said initiation signal; and in response to receipt of said channel reassignment acknowledgment signal, changing the bandwidth of said packet data channel by changing the assignment with respect to said packet data channel of any of said digital channels in said outgoing transmission path containing said pad characters, where the flow of data in said packet data channel continues without interruption through said bandwidth change even though said acknowledgment signal is received subsequent in time to channel reassignment at said remote node.

17. The method of claim 16 in which n is a positive integer and said channel reassignment initiation signal is transmitted over said packet data channel.

18. The method of claim 16 in which at least some digital channels in said outgoing transmission path for which connect/disconnect requests are detected are voice channels.

19. The method of claim 16 in which at least some digital channels in said outgoing transmission path for which connect/disconnect requests are detected comprise a single broad band time division multiplexed channel.

20. The method of claim 16 in which at least some digital channels in said outgoing transmission path for which connect/disconnect requests are detected comprise another packet data channel.

21. A method of transmitting digital message data to a remote packet network node over an outgoing digital transmission path and receiving digital message data from said remote node over an incoming digital transmission path, each of said digital transmission paths comprising a plurality of time division multiplexed digital channels and each of said digital channels having active and inactive states in response to respective connect and disconnect requests, said method comprising the steps of:

assigning to a packet data channel n of said digital channels in said outgoing transmission path, where n is an integer equal to or greater than zero;

detecting disconnect requests for any of said digital channels in said outgoing transmission path;

transmitting predetermined unique pad characters in any of said digital channels in said outgoing transmission path not assigned to said packet data channel in response to detection of respective channel disconnect requests, where said pad characters are ignored by said remote node whenever received and the flow of data in said packet data channel continues without interruption;

transmitting a channel reassignment initiation signal to said remote node over said outgoing transmission path;

receiving a channel reassignment acknowledgment signal from said remote node over said incoming transmission path, said acknowledgment signal signaling completion at said remote node of the channel reassignment requested by said initiation signal; and     in response to receipt of said channel reassignment acknowledgment signal, expanding the bandwidth of said packet data channel by adding any of said digital channels in said outgoing transmission path containing said pad characters to the digital channels assigned to said packet data channel, where the flow of data in said packet data channel continues without interruption through said bandwidth expansion even though said acknowledgment signal is received subsequent in time to channel reassignment at said remote node.

22. The method of claim 21 in which n is a positive integer and said channel reassignment initiation signal is transmitted over said packet data channel.

23. The method of claim 21 in which at least some digital channels in said outgoing transmission path for which disconnect requests are detected are voice channels.

24. The method of claim 21 in which at least some digital channels in said outgoing transmission path or which disconnect requests are detected comprise a single broad band time division multiplexed channel.

25. The method of claim 21 in which at least some digital channels in said outgoing transmission path for which disconnect requests are detected comprise another packet data channel.

26. A method of transmitting digital message data to a remote packet network node over an outgoing digital transmission path and receiving digital message data from said remote node over an incoming digital transmission path, each of said digital transmission paths comprising a plurality of time division multiplexed digital channels and each of said digital channels having active and inactive states in response to respective channel connect and disconnect requests, said method comprising the steps of:

assigning to a packet data channel n of said digital channels in said outgoing transmission path, where n is a positive integer;

detecting connect requests for any of said digital channels in said outgoing transmission path;

transmitting predetermined unique pad characters in at least one of said digital channels in said outgoing transmission path assigned to said packet data channel in response to detection of respective channel connect requests, where said pad characters are ignored by said remote node whenever received and the flow of data in said packet data channel continues without interruption;

transmitting a channel reassignment initiation signal to said remote node over said outgoing transmission path;

receiving a channel reassignment acknowledgment signal from said remote node over said incoming transmission path, said acknowledgment signal signaling completion at said remote node of the channel reassignment requested by said initiation signal; and     in response to receipt of said channel reassignment acknowledgment signal, contracting the bandwidth of said packet data channel by subtracting from said packet data channel any of said digital channels in said outgoing transmission path containing said pad characters, where the flow of data in said packet data channel continues without interruption through said bandwidth contraction even though said acknowledgment signal is received subsequent in time to channel reassignment at said remote node.

27. The method of claim 26 in which said channel reassignment initiation signal is transmitted over said packet data channel.

28. The method of claim 26 in which at least some digital channels in said outgoing transmission path or which connect requests are detected comprise separate voice channels.

29. The method of claim 26 in which at least some digital channels in said outgoing transmission path for which connect requests are detected comprise a single broad band time division multiplexed channel.

30. The method of claim 26 in which at least some digital channels in said outgoing transmission path for which connect requests are detected comprise another packet data channel.

\* \* \* \* \*